Figure 1:
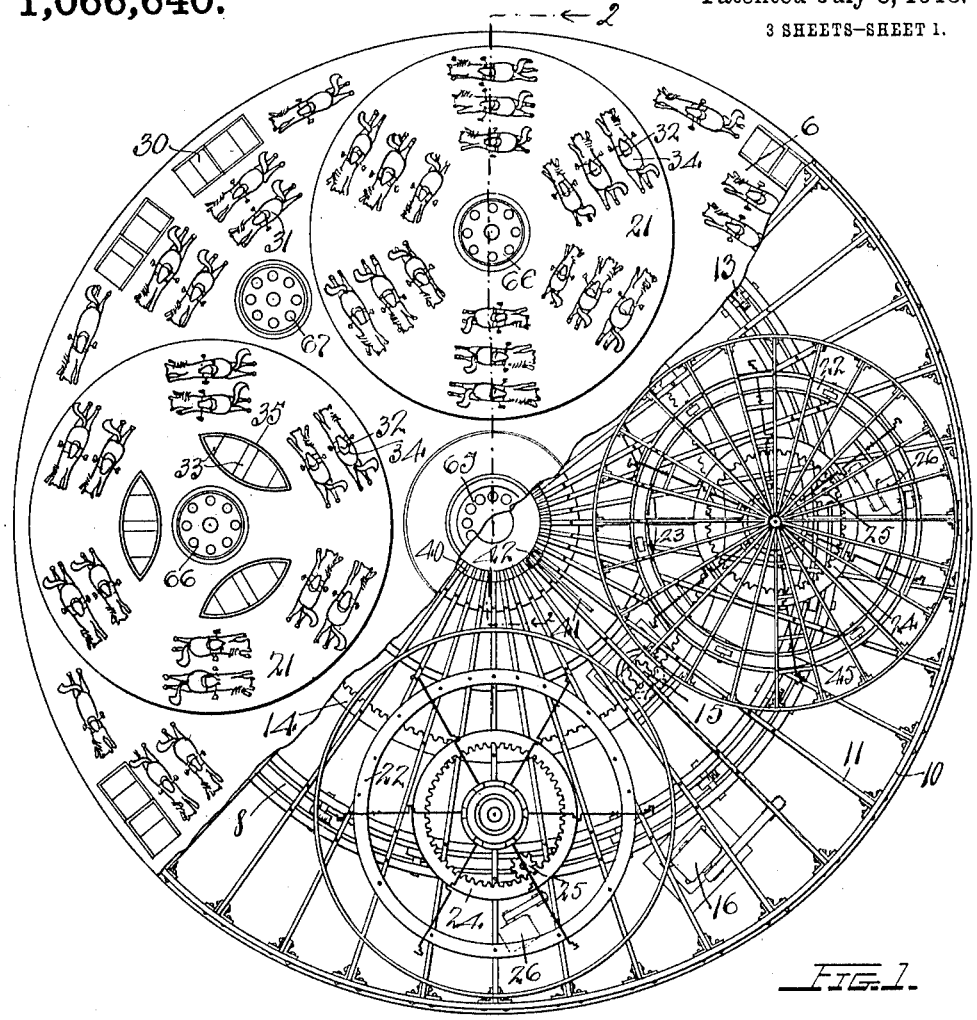

W. J. McLEVIE.
MERRY-GO-ROUND.
APPLICATION FILED APR. 8, 1911.

1,066,640.

Patented July 8, 1913.

3 SHEETS—SHEET 1.

Witnesses.

Inventor
Wm. J. McLevie
By Hull & Smith,
Attorneys

W. J. McLEVIE.
MERRY-GO-ROUND.
APPLICATION FILED APR. 8, 1911.
1,066,640.
Patented July 8, 1913.
3 SHEETS—SHEET 2.
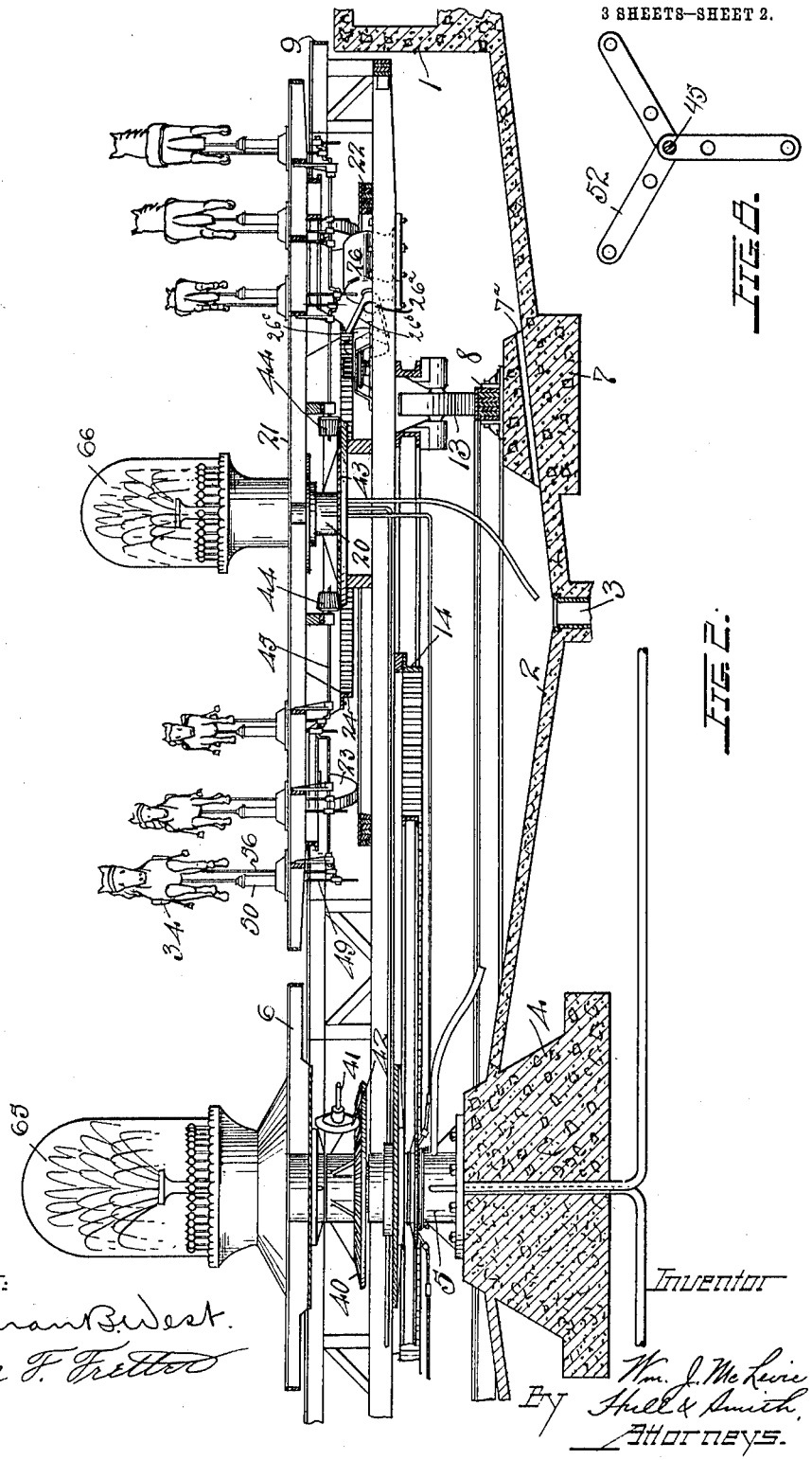

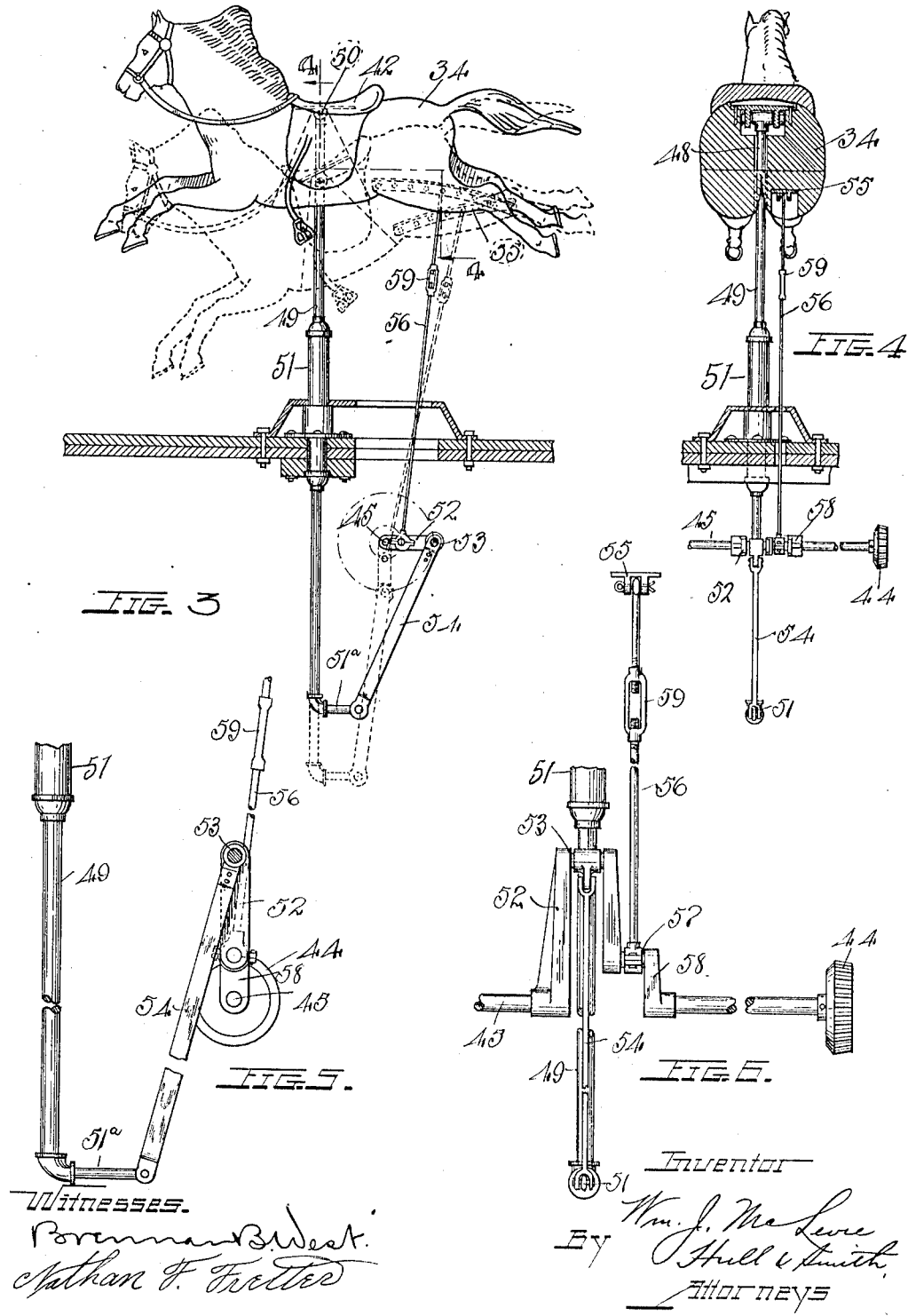

UNITED STATES PATENT OFFICE.

WILLIAM J. McLEVIE, OF EUCLID BEACH, OHIO.

MERRY-GO-ROUND.

1,066,640.   Specification of Letters Patent.   Patented July 8, 1913.

Application filed April 8, 1911. Serial No. 619,694.

*To all whom it may concern:*

Be it known that I, WILLIAM J. MCLEVIE, a citizen of the United States, residing at Euclid Beach, in the county of Cuyahoga and State of Ohio, have invented a certain new and useful Improvement in Merry-Go-Rounds, of which the following is a full, clear, and exact description, reference being had to the accompanying drawings.

This invention relates to pleasure apparatus of the class known as "carousels," "merry-go-rounds," or "round-abouts," and has for its object to produce a device of this class wherein the seats, especially those in the forms of animals, may be given a motion simulating that made by a horse or other animal in leaping an obstruction; also to give to such seats a motion which shall be free from any unpleasant effect upon the body or clothing of the rider; also to produce a device having seats in boats which shall possess a motion similar to that produced by riding over waves; also to provide an apparatus of this character with improved mechanism whereby auxiliary platforms are rotated upon the main platform, but independently of said main platform and of each other.

More specifically this invention introduces many improvements in construction and operation over that described and claimed in my former Patent No. 966,229, granted Aug. 2, 1910.

Figure 7:
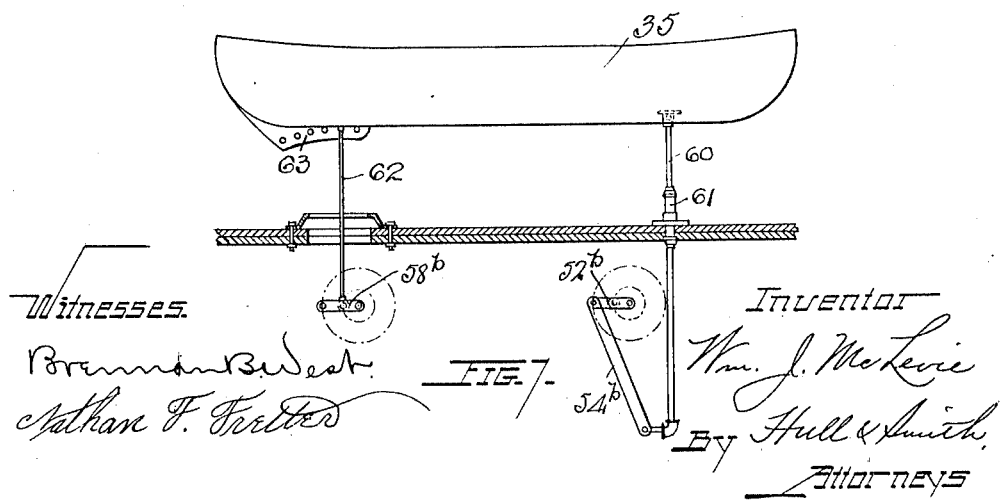

Generally speaking, the invention may be defined as consisting of the combinations of elements embodied in the claims hereto annexed and illustrated in the drawings forming a part thereof, wherein:

Figure 1 represents a plan view of a pleasure apparatus constructed in accordance with my invention, certain parts of the same being broken away to show the interior construction; Fig. 2, a cross sectional view taken on the dot-dash line 2—2 of Fig. 1 looking in the direction of the arrows, Fig. 1; Figs. 3 and 4, enlarged details illustrating the manner in which the seats are operated to impart the desired movement thereto; Figs. 5 and 6, details drawn to still larger scale illustrating the shape and arrangement of the cranks and their mode of connection to the operating rods; Fig. 7, a detail showing the method of mounting and operating one of the boats; and Fig. 8, a detail view showing the preferred arrangement of the cranks.

Describing the parts by reference characters, 1 denotes a circular casing which is preferably cylindrical in form and has an open top, and a closed bottom forming an annular trough 2 provided with suitable drainage pipes 3. A supporting pier 4 is formed at the center of this casing and carries a vertical center-post 5 about which the main platform 6 revolves, and between this pier and the wall of the casing is provided an annular support 7 upon which a circular rail 8 is mounted. The annular support 7 is provided with a suitable number of holes $7^a$ extending therethrough immediately above the adjacent portion of the trough bottom.

The main platform 6 is circular in shape and fits within the upstanding outer wall of the casing 1, and is preferably provided with a flange or extremity 9 overhanging the same in order to prevent accidents. This platform consists essentially of a circular metallic rim 10 having radial spokes 11 firmly secured thereto, which serve to support a suitable flooring. To the lower side of this platform are secured a plurality of rollers 13 which are adapted to run upon the track 8, and a circular rack or internal gear 14 adapted to mesh with a pinion 15 by means of which the whole may be rotated. This pinion is preferably operated by means of an electric motor 16 mounted upon the base of said casing beneath the platform and suitably connected with said pinion as shown in Fig. 1.

Between the center and periphery of the main platform there are provided a suitable number of upwardly projecting hollow posts 20, each having rotatably mounted thereon a platform 21, which is preferably a duplicate of the main platform on a smaller scale. A circular track 22 is carried by the main platform concentric with each of said posts, and the auxiliary platforms are provided with rollers 23 which run upon these tracks. Each of the auxiliary platforms is also provided with an annular rack or internal gear 24 meshing with pinions 25 carried by the main platform, and separately operated by motors 26 or other power sources carried by the main platform. This construction permits the auxiliary platforms 21 to be rotated at speeds entirely independent of that of the main platform and of each other. The motors 26 are provided each with a shaft having thereon a pulley $26^a$ which is connected by means of a belt $26^b$ to a pulley 26ᶜ on a shaft upon which the pinions 25 are driven.

No matter how many auxiliary platforms may be employed, it is obvious that portions of the main platform will not be covered thereby, and upon such uncovered portions I mount seats 30 and 31, the former being illustrated as carried in wagons, sleighs, or the like, and the latter as mounted upon the backs of dummy horses or other animals. Upon the auxiliary platforms I mount seats 32 and 33, the former being carried upon the backs of dummy horses or other animals 34, and the latter being formed in boats 35. Certain platforms are shown as provided with three concentrically arranged sets of horses, while others have two such sets of horses and a set of boats. In the latter instance I arrange the horses 34 in an even number of sets spaced about the platform 21, and employ half as many boats as sets of horses for a purpose to be hereinafter disclosed.

The post is provided with a stationary bevel gear 40 and the main platform is provided with a plurality of radial shafts 41 having bevel pinions 42 on their inner ends meshing with said gear, and these shafts serve to operate the seats 31 in the method to be hereinafter described. Stationary bevel gears 43 are also carried by the posts 20, and coöperate with pinions 44 to drive shafts 45 carried by the auxiliary platform which operate the seats upon said platform.

The method of mounting the dummies and of causing them to simulate a leaping motion will now be described. The body of each dummy is formed with a narrow vertical slot 48 directly beneath the center of the seat or saddle and a supporting post 49 is pivoted in a bracket 50 secured immediately beneath the saddle. This post 49 is slidably mounted in a vertical sleeve 51 rigidly secured to the floor of the platform, and has its lower end offset as shown at 51ᵃ and terminated substantially below the shaft 45. A crank 52 is carried by the shaft immediately above this offset end, and the wrist pin 53 thereof is connected to the offset end 51ᵃ by means of the pitman 54. As this shaft revolves it will be obvious that the dummy will be alternately raised and lowered upon the post 49.

In order to give the dummy the pitching or fore and aft movement necessary to complete the illusion of leaping, I secure to the under side of the body thereof, preferably upon the arc substantially defined by one of the extended rear legs, a plate 55 having a plurality of perforations therethrough adapted for the reception of an operating rod 56, the lower end of which is articulated to the wrist pin 57 of a second crank 58 carried by the shaft 45. With this construction it is obvious that the rotation of the shaft 45 will cause the reciprocation of the operating rod 56 so as to give to the dummy a rocking or pitching movement, the extent of which can be regulated by securing the upper end of the rod to the proper point in the plate 55. Both the cranks 52 and 58 project in the same direction from the shaft 45, the crank 52 being longer than the crank 58. As these cranks ascend, by rotation of the shaft 45, the longer crank 52 will elevate the front end of the horse faster than the shorter crank will elevate the rear end, and so lift the front of the dummy in the manner that would be assumed in taking a leap. As the cranks descend to a horizontal position on the other side, the front end of the dummy descends until the back is level, as shown in Fig. 3 in full lines. As the cranks pass around the lower center, the front end of the dummy is depressed faster than the rear end and the dummy assumes the position that would be assumed in finishing a leap as shown in dotted lines in Fig. 3. The operating rod 56 is provided with a turn-buckle 59 by means of which the relation between the rod and the post 49 can be adjusted.

From another point of view, the motion of the dummy is the resultant of two different movements, the first being an up and down movement of the whole animal, caused by the post 49 and the second a rocking motion about the upper end of this post as a center. In order to fully understand the advantages of my invention, it will be desirable to keep both these explanations in mind.

Each of the shafts 45 is illustrated as carrying three sets of cranks, set at one hundred and twenty degrees apart as illustrated in Fig. 8, and the two outer sets of cranks serve to operate the pairs of dummies shown at the outside of the auxiliary platform, while the difference in phase between those cranks causes the dummies to assume corresponding positions at different times. In case the particular platform be one of those having three ranks of horses or other like dummies, the innermost dummy is connected to the inner crank of the corresponding shaft in the same manner as are the outer dummies. In case the platform be one of those provided with boats, the inner crank of each of the shafts is connected to one end of one of such boats, the opposite end of said boat being connected with the corresponding crank of the adjacent shaft. One end of the boat is supported upon a vertical post 60 slidably mounted in a sleeve 61 carried by the floor of the platform, and articulated to the crank 52ᵇ by means of the pitman 54ᵇ. The other end of the boat is supported by means of an operating rod 62, articulated at its lower end to a comparatively short crank 58ᵇ, and having its upper end pivoted to an arcuate plate 63 carried by the boat. With this construction the boat is given a pitching motion, comparable to that developed in riding over waves, and the amount of that motion can be regulated within limits by shifting the operating rod 62 along the plate 63. It will be seen that each boat is operated by a pair of shafts, thus causing it to possess a different motion than that possessed by the dummies and rendering it capable of receiving a larger number of riders.

The dummies carried by the main platform may be arranged in any convenient or desirable position, and may be rocked or not as desired. When rocked they will be suitably connected to suitable shafts, usually by the method above explained, or any other suitable manner. At the same time I prefer to leave some of these dummies stationary, in order to please those patrons who might not desire the more strenuous motion.

In order to add to the attractiveness of the device, I provide it with a plurality of fountains illustrated at 65, 66 and 67. The fountain 65 is preferably mounted directly on the top of the center post 5, and the fountains 66 upon the posts 20 which carry the auxiliary platforms, while the fountains 67 are preferably carried by the main platform between the auxiliary platforms as illustrated in Fig. 1. Water and electricity are supplied to these fountains by any suitable means, such for instance as that disclosed in my prior patent above referred to, and the crossing and recrossing of the lights caused by their motion about each other forms an extremely attractive spectacle both to riders and to spectators.

I have illustrated the dummies as having the form of horses, though it will be obvious that some or all of them may be given other forms depending upon the whim of the manufacturer or the fancy of the public. Furthermore, their grouping, while the best that I have contemplated, is not mandatory and may be varied without departing from the scope of my invention, and in general it should be understood that I consider all variations and modifications of my apparatus as within the scope of my invention except as limited by the prior art and by the express terms of the claims hereto annexed.

Having thus described my invention, what I claim is:

1. In an apparatus of the character set forth, the combination, with a main platform and auxiliary platforms carried thereby, of means for rotating the main platform, means for rotating the auxiliary platforms with respect to the main platform, a plurality of seats carried by each of the auxiliary platforms, and means for imparting movement to said seats by the rotary motion of the auxiliary platform.

2. In an apparatus of the character set forth, the combination, with a main platform and auxiliary platforms carried thereby, of means for rotating the main platform, means for rotating the auxiliary platforms with respect to the main platform, a plurality of seats carried by each of the auxiliary platforms, a plurality of seats carried by said main platform between said auxiliary platforms, and means for imparting movement to said seats by the rotary motion of their respective platforms.

3. In an apparatus of the character set forth, the combination of a main platform and a plurality of auxiliary platforms, means for rotating all said platforms, a plurality of seats on each of said auxiliary platforms, and means for operating each of said seats, said means comprising an operating shaft, connections between the same and a seat, and means operated by the rotation of the platforms for rotating the said shafts.

4. In an apparatus of the character set forth, the combination of a platform, means for rotating the same, a plurality of seats on said platform, and means for operating said seats, said means comprising an operating shaft, connections between the same and a seat, and means operated by the rotation of the platform for rotating the said shaft.

5. In an apparatus of the character set forth, the combination with a platform and means for rotating the same, of a dummy, and means for imparting movement to said dummy, said means comprising a pair of arms, one of said arms being pivotally connected to the front portion of the dummy and the other being connected to the rear portion of the dummy, and means for operating said arms, said means comprising a shaft having two offset or cranked portions, both of said portions projecting in the same direction and one of said portions being offset farther than the other, and links connecting the cranks thus formed with said arms.

6. In an apparatus of the character set forth, the combination of a dummy, and means for operating the same, said means comprising an arm pivotally connected to the front portion of the dummy and a second arm pivotally connected to the rear portion of the dummy, means for reciprocating said arms, said means comprising a crank shaft having projecting therefrom in the same direction two cranks of unequal length, a link connecting the longer crank with the rod which is connected with the front portion of the dummy, and a link connecting the shorter crank with the rod which is connected to the rear portion of the dummy.

7. In an apparatus of the character set forth, the combination of a dummy, and means for operating the same, said means comprising an arm pivotally connected to the front portion of the dummy and a second arm pivotally connected to the rear portion of the dummy, means for reciprocating said arms, said means comprising a crank shaft having projecting therefrom two cranks of unequal length, a link connecting the longer crank with the rod which is connected with the front portion of the dummy, and a link connecting the shorter crank with the rod which is connected to the rear portion of the dummy, said latter link being adapted for connection to said dummy at different distances from said first link.

8. In an apparatus of the character described, the combination, with a platform and means for rotating the same, of a vertical sleeve carried by said platform, a post slidably mounted in said sleeve and having a seat-carrying device pivoted to its upper end, means for reciprocating said post through said sleeve, an operating rod connected to said seat-carrying device at a point removed from said post, and means for reciprocating said operating rod to produce a rocking or pitching motion of said carrying device.

9. In an apparatus of the character described, the combination, with a platform and means for rotating the same, of a vertical post slidably mounted in said platform and having a seat-carrying device pivoted to its upper end, means for reciprocating said post, an operating rod connected to said seat-carrying device at a point removed from said post, and means for reciprocating said operating rod to produce a rocking or pitching motion of said carrying device.

10. In an apparatus of the character set forth, the combination, with a platform and means for rotating the same, of a plurality of seat-carrying dummies spaced about the outer part of said platform, radial shafts carried by said platform and adapted to be revolved by the rotation thereof, said shafts being equal in number to the number of sets of dummies and operatively connected thereto, and elongated seat-carrying devices bridging the inner ends of adjacent shafts and having the ends of such devices operatively connected to the shafts over which they extend.

11. In an apparatus of the character set forth, the combination, with a platform and means for rotating the same, of a plurality of seat carrying dummies spaced about the outer part of said platform, radial shafts carried by said platform and adapted to be revolved by the rotation thereof, said shafts being equal in number to the number of sets of dummies and operatively connected thereto, elongated seat-carrying devices bridging the inner ends of adjacent shafts, vertical links pivoted at their upper ends to said devices, and connections between each of said links and one of said shafts whereby said links are reciprocated as said shafts revolve.

12. In an apparatus of the character set forth, the combination, with a platform and means for rotating the same, of a plurality of radial shafts carried by said platform and adapted to be revolved by the rotation of said platform, a vertically reciprocable post carried by said platform adjacent each of said shafts and having an offset end extending beneath said shaft, a crank carried by said shaft and having a pitman articulated to said offset end, a seat-carrying member pivoted to the upper end of said post, an operating rod articulated to said member at a point removed from said post, and a second crank carried by said shaft and connected to said operating rod, the radius of first crank being greater than that of said last crank.

13. In an apparatus of the character set forth, the combination, with a platform and means for rotating the same, of a plurality of shafts carried by said platform and adapted to be revolved by the rotation of said platform, a vertically reciprocable post carried by said platform adjacent each of said shafts and having an offset end extending beneath said shaft, a seat carrying member pivoted to the upper end of said post, an operating rod articulated to said member at a point removed from said post, and means for reciprocating both said post and said rod by the rotation of said shaft, such reciprocation being unequal in amount but equal in phase.

14. In an apparatus of the character set forth, the combination, with a main circular platform, of a plurality of auxiliary platforms carried thereby, means for rotating all said platforms, seat-carrying members carried by said auxiliary platforms and operated by the rotation thereof, and seat-carrying members carried by said main platform in the spaces left by said auxiliary platforms, and means actuated by the rotation of said main platform for operating said last dummies.

15. In an apparatus of the character set forth, the combination with a platform and means for rotating the same, of a vertically reciprocable post carried by said platform, a seat-carrying member pivoted to the upper end of said post, said pivot being immediately below the seat, an operating rod secured to said member at a point removed from said post, and means for reciprocating both said post and said operating rod to give said member the similitude of an animal leaping.

16. In an apparatus of the character set forth, the combination, with a platform and means for rotating the same, of a reciprocable post carried by said platform, a seat carrying member pivoted to the upper end of said post, an operating rod pivoted to said member in the rear of said post, means for shifting the point of attachment of the operating rod as regards said post, and means for simultaneously reciprocating said rod and post so as to give said dummy an up and down motion as regards the platform and a rocking movement about the end of said post.

17. In an apparatus of the character set forth, the combination, with a platform and means for rotating the same, of a reciprocable post carried by said platform, a seat carrying member pivoted to the upper end of said post, said pivot being immediately below such seat, an operating rod pivoted to said member in the rear of said post, and means for simultaneously reciprocating said rod and post so as to give said member an up and down motion as regards the platform and a rocking movement about said first pivot.

18. In an apparatus of the character set forth, the combination with a platform and means for rotating the same, of a plurality of radial shafts carried by said platform and adapted to be revolved by the rotation of said platform, seat-carrying members carried by said platform and actuated by the outer ends of said shafts, and seat-carrying devices bridging across the inner ends of adjacent shafts and having each end thereof operatively connected to one of said shafts.

19. In an apparatus of the character set forth, the combination with a platform and means for rotating the same, of a plurality of radial shafts carried by said platform and adapted to be revolved by the rotation of said platform, pairs of seat-carrying members carried by said platform and actuated by the outer ends of said shafts, the phase of motion of said members being unequal, and seat-carrying devices bridging across the inner ends of adjacent shafts and having each end thereof operatively connected to one of said shafts, the phase of motion of said devices being different from that of the dummies.

20. In an apparatus of the character described, the combination with a platform and means for rotating the same, of a vertical sleeve carried by said platform, a post slidably mounted in said sleeve and having a seat carrying device pivoted to its upper end, means for reciprocating said post through said sleeve, an operating rod connected to said seat-carrying device in the rear of said post, means for reciprocating said operating rod to produce a rocking or pitching motion of said carrying device, the limits of reciprocation of said post being greater than those of the operating rod.

21. In an apparatus of the character described, the combination with a platform and means for rotating the same, of a vertically reciprocable post carried by said platform, and having a seat-carrying device pivoted to its upper end, means operated by the rotation of said platform for reciprocating said post, an operating rod connected to said seat-carrying device in the rear of said post, means for reciprocating said operating rod to produce a rocking or pitching motion of said carrying device, the limits of reciprocation of said post being greater than those of the operating rod, and the phase of motion of said post and rod being equal.

22. In an apparatus of the character set forth, the combination with a platform and means for rotating the same, of a vertically reciprocable post carried by said platform and having a seat-carrying device pivoted to its upper end, an operating rod connected to said seat-carrying device at a point removed from said post and in the rear thereof, and means for reciprocating said rod and post simultaneously, the rate of translation of said rod being less than that of said post, whereby the rear end of said device is caused to lag behind the forward end thereof both in ascending and descending, but the times of arriving at their limiting positions being the same, in order that said seat may be substantially horizontal at those times.

23. In an apparatus of the character set forth, the combination with a platform and means for rotating the same, of a vertically reciprocable post carried by said platform and having a seat-carrying device pivoted to its upper end, said pivot being immediately beneath the middle of said seat, an operating rod connected to said seat-carrying device at a point removed from said post and in the rear thereof, means whereby the point of attachment of said operating rod to said dummy can be shifted, and means for reciprocating said rod and post simultaneously, the rate of translation of said rod being less than that of said post, whereby the rear end of said device is caused to lag behind the forward end thereof both in ascending and descending, but the times of arriving at their limiting positions being the same, in order that said seat may be substantially horizontal at those times.

24. In an apparatus of the character set forth, the combination with a platform and means for rotating the same, of a seat carrying dummy, vertical reciprocable arms extending upwardly from said platform to a pivotal connection with separated parts of said dummy below the seat carried thereby, a rotatable shaft carried by said platform, means for rotating said shaft, and eccentric connections between said rods and said shaft adapted to impart a reciprocatory movement to said arms so as to move said dummy after the similitude of an animal leaping.

25. In an apparatus of the character set forth, the combination, with a platform and means for rotating the same, of a seat carrying device, rotatable shafts carried by said platform, means for rotating said shafts in unison, reciprocable arms pivoted to longitudinally separated portions of said device below the seat carried thereby and extending downwardly through said platform, and eccentric connections between each of said shafts and one of said arms for imparting a reciprocatory movement to said arm so as to give said device as a whole an up and down movement combined with an oscillatory movement about a transverse axis.

26. In an apparatus of the character set forth, the combination, with a platform and means for rotating the same, of a pair of shafts mounted beneath said platform and adapted to be revolved simultaneously with the rotation of said platform, a pair of reciprocatory rods extending upwardly through said platform and having seat-carrying devices pivoted between their upper ends, and eccentric connections between each of said shafts and one of said rods adapted to impart to said rods unequal amplitudes of reciprocatory movement in substantially equal phases so as to impress upon said seat-carrying devices a rocking or pitching movement.

27. In an apparatus of the character set forth, the combination, with a platform and means for rotating the same, of an upwardly extending reciprocable post carried by said platform, a seat-carrying dummy pivoted to the upper end of said post, an operating rod secured to said dummy at a point removed from said post, and means for reciprocating both said post and said rod so as to give said dummy the similitude of an animal leaping, the point of attachment of said post and rod to said dummy and their relative movement being so arranged as to give the seat an up and down movement only while denying any fore and aft movement of translation thereto.

28. In an apparatus of the character set forth, the combination, with a platform and means for rotating the same, of an upwardly extending post carried by said platform, means for reciprocating said post, a seat-carrying dummy pivoted to the upper end of said post, said dummy being made in the form of an animal and said pivot being fixed a material distance above the belly thereof, an operating rod secured to said dummy at a point removed from said post, and means for reciprocating both said post and said operating rod to give said dummy a combined up and down reciprocating movement and a fore and aft rocking movement.

In testimony whereof, I hereunto affix my signature in the presence of two witnesses.

WILLIAM J. McLEVIE.

Witnesses:
J. B. HULL,
DON BALDWIN.

---

Copies of this patent may be obtained for five cents each, by addressing the "Commissioner of Patents, Washington, D. C."